July 27, 1954     R. G. SWANSON     2,684,560
CLEANSING MOLDED PLASTIC ARTICLES
Filed Jan. 2, 1952     5 Sheets-Sheet 1

Inventor
ROBERT G. SWANSON
By Rule & Hoge,
Attorneys

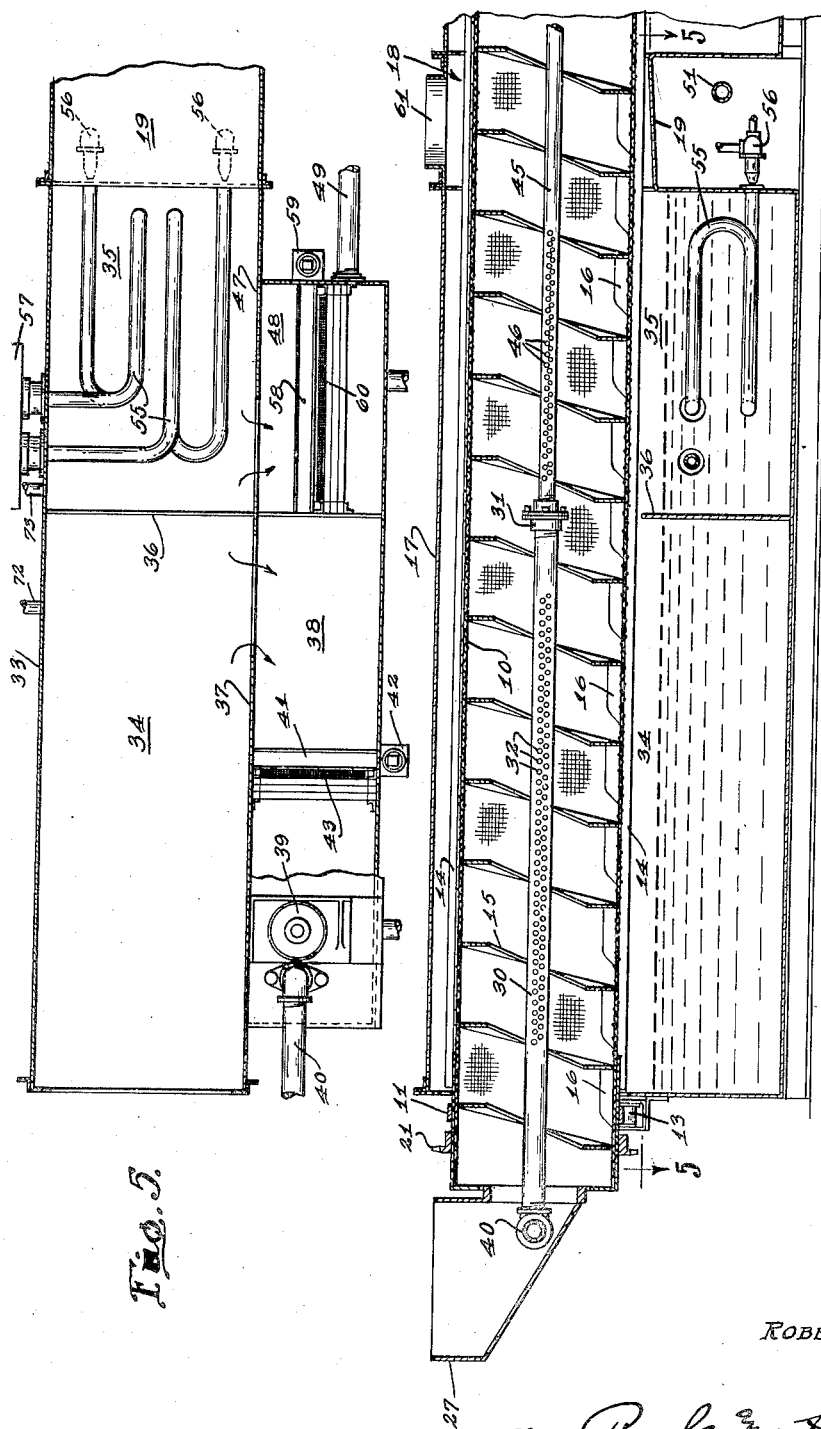

July 27, 1954
R. G. SWANSON
2,684,560
CLEANSING MOLDED PLASTIC ARTICLES
Filed Jan. 2, 1952
5 Sheets-Sheet 5
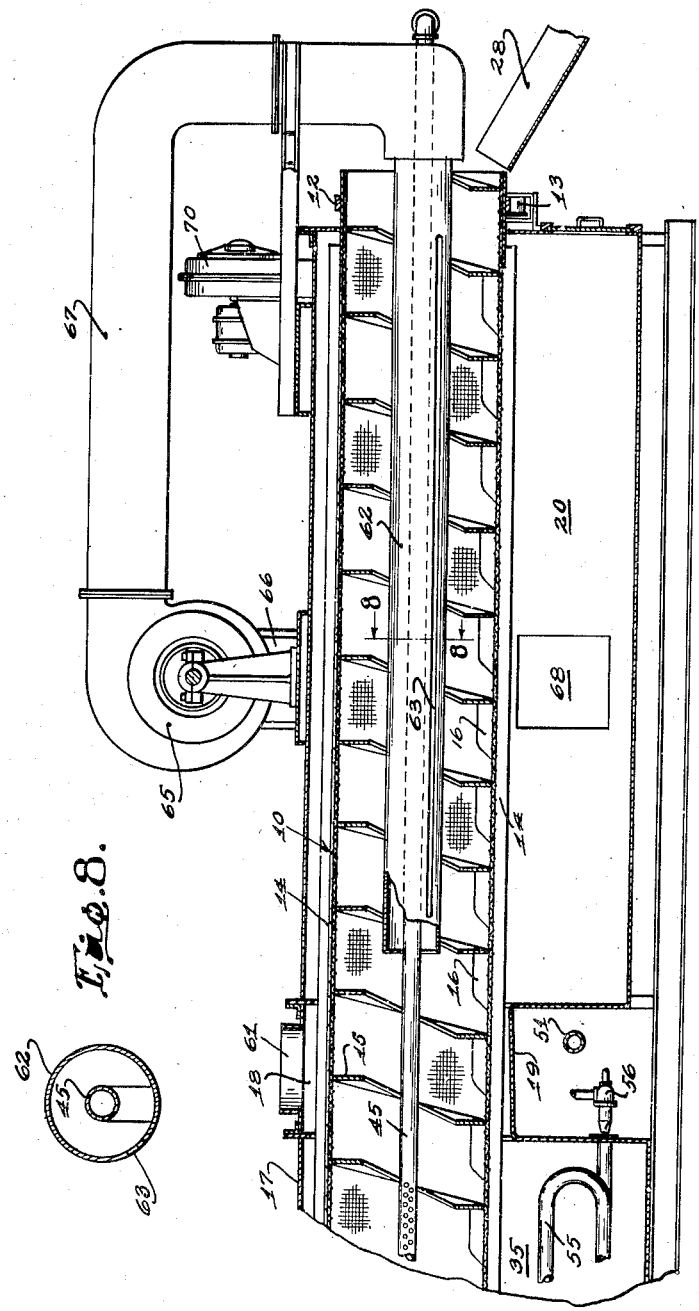
Inventor
ROBERT G. SWANSON
By Rule and Hoge.
Attorneys Patented July 27, 1954

2,684,560

UNITED STATES PATENT OFFICE 2,684,560

CLEANSING MOLDED PLASTIC ARTICLES

Robert G. Swanson, Dundee, Ill., assignor to Owens-Illinois Glass Company, a corporation of Ohio Application January 2, 1952, Serial No. 264,371

5 Claims. (Cl. 51—164)

This invention relates to the cleansing of small articles and more particularly to an apparatus for cleansing molded plastic articles such as closures for containers.

In the present commercial manufacture of plastic articles by molding, a ridge or flash of plastic material usually remains on the molded articles. This flash is removed and the article is then subjected to blowing air to remove the fragments of plastic material. In the case of plastic closures, liners may be inserted in the closures and the closures then placed in cartons and sealed for shipment to the customer. Although the plastic articles or closures appear to be absolutely clean when sealed in the cartons, by the time they reach the customer they are often smudged in appearance and the liners therein appear to be dirty. These conditions are not only objectionable from the standpoint of appearance but also make the plastic closure unsuitable for use with containers for pharmaceuticals, foods, and the like.

It is, therefore, an object of this invention to provide an apparatus for cleansing the plastic articles to obviate and overcome the objections noted above.

Other objects of the invention will appear hereinafter. I have determined that the smudged or dirty appearance of the plastic articles is caused by foreign particles which are held electrostatically on the surfaces of the articles. These particles consist of cured fragments of plastic material and uncured particles of molding powder from the molding operation or the surrounding air. According to the invention, I have developed an apparatus which will insure the removal of these foreign particles from the surfaces of the plastic articles.

Broadly, my apparatus comprises means for moving the plastic articles in a substantially horizontal path and simultaneously tumbling the articles, together with means for washing, rinsing, and drying the articles as they are moved in the horizontal path.

Referring to the accompanying drawings:

Fig. 5 is a part-sectional view at the line 5—5 on Figs. 4 and 6;

Fig. 6 is a sectional view at the line 6—6 on Fig. 2;

Fig. 7 is a sectional view at the line 7—7 on Fig. 2; and

Fig. 8 is a sectional view at the line 8—8 on Fig. 7.

Figure 1:
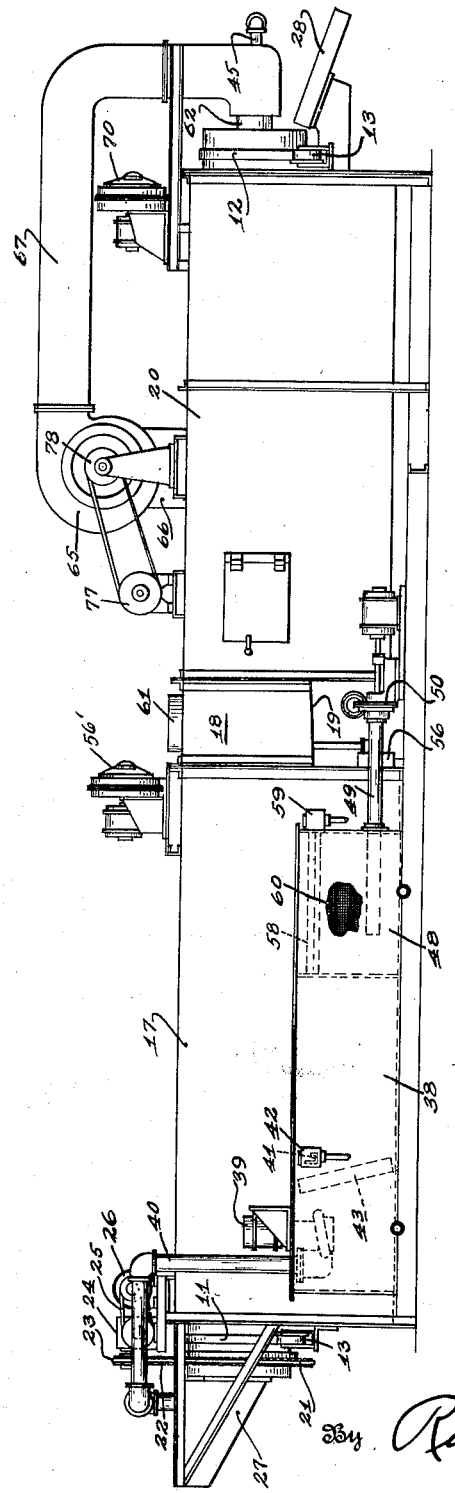
Fig. 1 is an elevational view of the apparatus.

Referring to Fig. 1, which is an elevational view of the entire apparatus, the plastic articles are introduced at the left end of the apparatus and are progressively moved towards the right end of the apparatus. During this movement they are successively washed, rinsed, and dried, being removed from the apparatus in a clean and dry condition.

Figure 2:
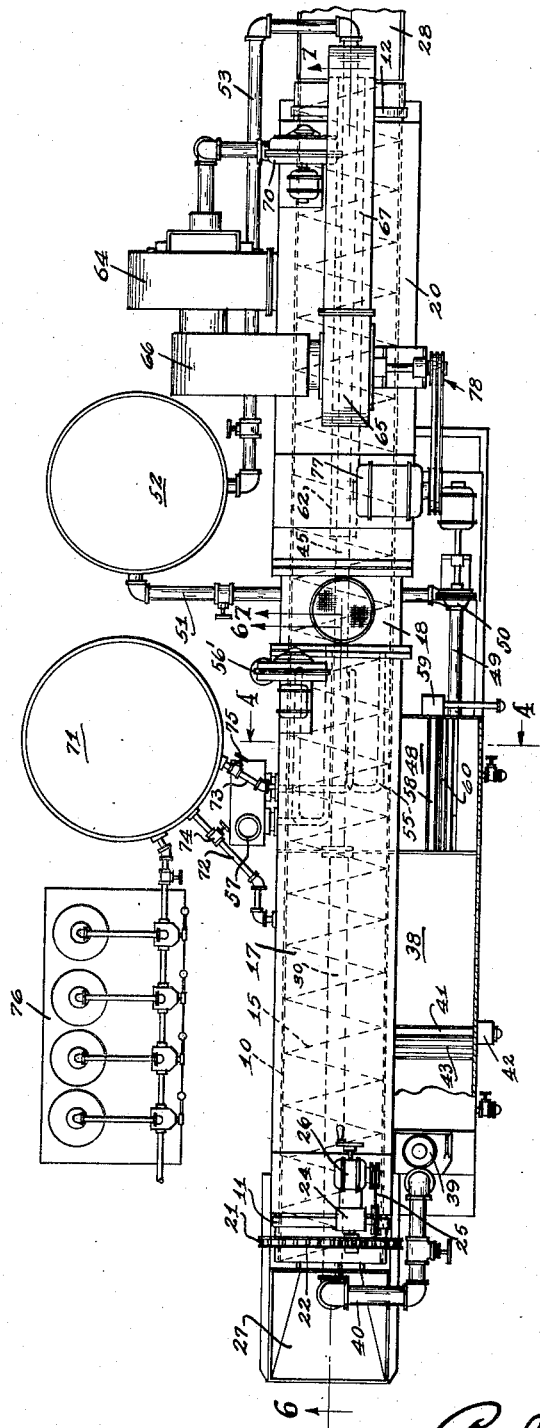
Fig. 2 is a plan view of the apparatus.

As shown by the dotted lines in Fig. 2, the means for transporting the plastic articles through the apparatus comprises a rotatable tubular cylinder 10 formed with means on the interior thereof for moving the plastic articles from one end of the apparatus to the other. The cylinder is supported at either end thereof by collars or rings 11, 12 resting on rollers 13.

Figure 3:
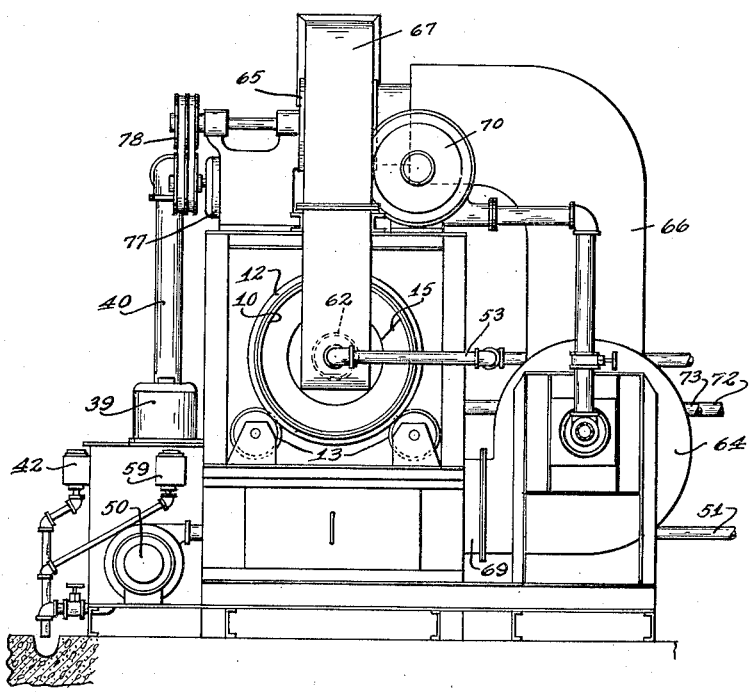
Fig. 3 is an end elevational view of the apparatus.
Figure 4:
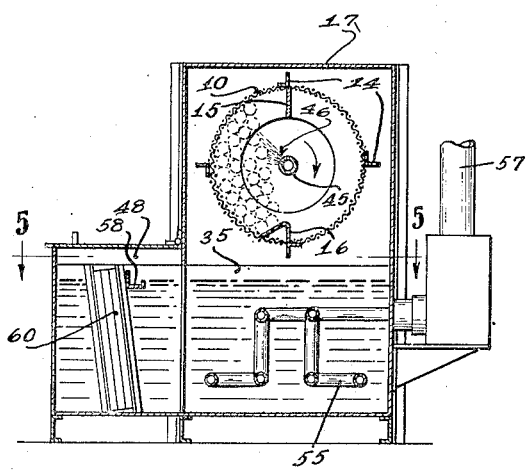
Fig. 4 is a sectional view at the line 4—4 on Fig. 2.

The construction of the cylinder 10 is shown more clearly in Fig. 6. It is made of perforated material such as wire mesh reinforced with longitudinally extending angle members 14. A continuous spiral web 15 is formed on the interior surface of the cylinder and extends through substantially the entire length of the cylinder. As shown in Figs. 4 and 6, small angular baffle plates or projections 16 are positioned to extend longitudinally within the cylinder between the spirals of the web and arranged in a row extending substantially the full length of the cylinder, in order to insure a tumbling of the plastic articles as they are progressively moved through the cylinder. Referring to Figs. 1 and 2, the left-hand portion of the cylinder is surrounded on the top and sides thereof by a cabinet 17. A small section at the center portion of the cylinder is surrounded on all sides by a small rectangular cabinet 18. The bottom panel 19 of the cabinet 18 is sloped towards the left end of the cylinder as viewed in Fig. 1. The right-hand portion of the cylinder is surrounded on all sides by a larger rectangular cabinet 20 (Figs. 1, 2, and 3).

As shown in Figs. 1 and 2, the cylinder 10 is rotated by means of a ring gear 21 formed on one end thereof driven by a chain 22 and pinion 23 from a gear box 24. The gear box is in turn operated by pulley and belt assembly 25 connected to a motor 26 mounted on the top of cabinet 17.

A chute 27 is positioned at the left end of the cylinder to guide the plastic articles through the open end of the cylinder. In a similar manner, a second chute 28 is positioned at the right end of the cylinder to guide the plastic articles out of the cylinder.

Referring to Fig. 6, means are provided at the left end of the cylinder for subjecting the plastic articles to a washing solution as they are moved through said cylinder. This means comprises a spray pipe 30 positioned centrally within said cylinder and extending longitudinally of said cylinder. The pipe extends to a dead-end joint 31 and is formed with holes 32 drilled in such a manner that the washing solution is sprayed upwardly at an angle above the horizontal. This is preferred in order that the washing solution will contact the surfaces of the plastic articles as the articles tumble downwardly within the cylinder.

Referring to Figs. 5 and 6, a drain tank 33 forms part of the cabinet 17 below the cylinder. This tank is divided into two compartments 34, 35 by a transverse wall 36. The washing solution drains from the cylinder into the compartment 34. A side panel 37 of the compartment 34 is provided with an opening into a small washing solution tank 38 so that the washing solution flows from the compartment 34 to the washing solution tank 38. The solution is recirculated from the tank 38 by means of pump 39 and pipe 40 leading to the spray pipe 30. In this manner a continuous circulation of the washing solution takes place. As shown in Fig. 5, provision is made for removing scum or other accumulation from the surface of the washing solution in the compartment 34 and includes an inclined trough 41 leading to a drain pipe 42. In addition, solid particles are prevented from recirculating in the system by a bank of screens 43 positioned transversely in the compartment 34.

After the plastic articles are moved through the washing section of the apparatus, they pass through a rinsing section. A rinsing solution is applied to the plastic articles in the form of a spray by a pipe 45 positioned centrally within said cylinder and extending longitudinally of said cylinder from the right-hand end of the cylinder as viewed in Fig. 2. The pipe 45 extends to the dead end joint 31 and is provided with holes 46 drilled in such a manner that the rinsing solution is sprayed upwardly at an angle above the horizontal. This is preferred in order that the rinsing solution will contact the surfaces of the plastic articles as the articles are tumbled downwardly within the cylinder.

Referring to Figs. 5 and 6 the rinsing solution drains from the cylinder into the compartment 35. A side panel 47 of the compartment 35 is provided with an opening into a small rinsing solution tank 48 so that the rinsing solution flows from the compartment 35 to the tank 48. The solution flows from the tank 48 to pipe 49. A pump 50 (Fig. 2) forces the fluid through a pipe 51 to a filter 52 where solid particles and other foreign matter are removed. After passing through the filter the solution is returned to the spray pipe 45 by means of a pipe 53. As shown in Fig. 5, provision is made for heating the rinsing solution and comprises coils 55 in the compartment 35. The coils 55 are heated by means of a flame from the burners 56 passing therethrough. Air is supplied to the burner 56 by a small blower 56' (Fig. 2) on top of the cabinet 17. The fumes and gases from the flames are exhausted to a stack 57. Means is also provided for removing scum or other accumulation from the surface of the rinsing solution and includes an inclined trough 58 leading to a drain pipe 59. In addition, solid particles are prevented from recirculating in the system by a bank of screens 60 positioned longitudinally in the compartment 35.

After being moved through the rinsing section of the apparatus the plastic articles pass through a short drain section which includes the cabinet 18 (Figs. 1, 6). Since the bottom panel 19 of the cabinet is sloped towards the rinsing solution tank 48 the excess rinsing solution will drain from the articles through the cylinder to the tank. The top of the drain cabinet is provided with a vent 61 to the atmosphere.

The articles are then moved by the cylinder through the last portion of the apparatus which includes means for drying the articles. The means for drying the articles comprises a duct 62 (Figs. 7, 8) positioned centrally within the cylinder and extending longitudinally thereof around the rinsing spray pipe 45. The duct is provided with a longitudinal slit 63. Heated air is supplied to this duct and is forced through the slit to dry the articles. Referring to Fig. 2 the air is heated by means of a heater 64 and is moved from the heater to a blower 65 through a duct 66. From the blower the air is transported to the drying duct by a duct 67. Provision is made for recirculating this air and includes an opening 68 in the side panel of the cabinet 20 (Fig. 7) and duct work 69 leading to the heater (Fig. 3). The burner uses gas to heat the air. A small air blower 70 is provided on top of the cabinet 19 to supply sufficient air for the gas burners of the heater. The blower is driven by a motor 77 and pulley assembly 78 positioned on the cabinet 20.

I have found that in both the washing and rinsing solutions it is desirable to use a de-mineralized water. Inasmuch as it is necessary to replenish the solution periodically the apparatus includes means for so doing. As shown in Fig. 2 a storage tank 71 is positioned at one side of the apparatus and includes pipes 72 and 73 leading to the washing and rinsing sections respectively. Valves 74 and 75 are provided in these pipes in order that the water may be supplied to the sections as needed. Means for de-mineralizing the water may also be included leading directly into the storage tank as shown for example at 76.

The washing solutions or compounds which are used in conjunction with the apparatus may be added manually to the respective sections of the apparatus as needed. In regard to the washing solution, I have found it preferable to use a solution which has the desired wetting characteristics, is inert physiologically, does not irritate the human skin, has no odor, and does not affect the characteristics of the plastic articles.

The filter which is used in conjunction with the rinsing solution may be of any of the usual types, for example, diatomaceous earth filters, which are easily regenerated.

The operation of the apparatus may be summarized as follows: Plastic articles are guided into the left-hand end of the hollow cylinder by the trough 27. These articles are moved through the rotating cylinder by the internally formed spiral web. As the articles are moved through the cylinder they are also subjected to a tumbling action. In the first portion of the apparatus, the articles are subjected to a spray of washing solution. This spray is directed upwardly against the surfaces of the tumbling articles in order to provide a better washing action. After being washed, the articles are moved through a spray of rinsing solution applied upwardly against the articles, in the same manner as the washing solution. The articles are then moved through a short drain section and then through the drying section where they are subjected to heated air for drying. The air is applied from a position within the cylinder outwardly across the surfaces of the articles for better drying.

I have found that cleansing plastic articles by this apparatus, not only thoroughly cleanses the articles of all foreign particles permitting their use with food, pharmaceuticals and the like, but also produces further beneficial results. As a result of the cleansing action, I have found that the application of inks or enamels to the surfaces of the articles is greatly facilitated. In addition, the articles take on an exceedingly attractive lustre and appearance, especially when the articles are molded from phenolic or urea plastics.

Modifications may be resorted to within the spirit and scope of the appended claims.

I claim:

1. Apparatus for cleaning molded plastic articles or other articles, said apparatus comprising a tubular cylinder mounted with its axis extending horizontally, means for rotating the cylinder about its axis, a spiral web extending lengthwise through the cylinder along the inner wall surface thereof, a stationary pipe extending lengthwise through the cylinder, means for feeding the articles into the cylinder at one end thereof and discharging them at the opposite end, the cylinder including a washing compartment and a drying compartment, means for supplying a washing fluid to said pipe, the latter formed with openings in the washing compartment through which the fluid is directed against the articles, a tubular drum mounted within said drying compartment surrounding and concentric with said pipe and of smaller diameter than the cylinder, said drum formed with a slot extending lengthwise thereof substantially the full length of the drying compartment, and means for supplying a drying fluid within said drum, said drying fluid being directed through said slot against the articles within the drying compartment.

2. Apparatus for cleaning molded plastic articles or other articles, comprising a horizontal tubular cylinder, means for rotating the cylinder about its axis, a spiral web within and attached to the cylinder for rotation therewith and extending lengthwise thereof substantially the full length of the cylinder, the outer edge of the web extending along and in contact with the inner wall surface of the cylinder, the web forming a means by which the articles are fed through the cylinder, a stationary pipe extending lengthwise through the cylinder and concentric therewith, baffle plates arranged in a row within the cylinder, attached to the inner cylinder wall and projecting inwardly therefrom and forming tumbling means by which the articles as they are carried through the cylinder by the rotation thereof are lifted to positions above the axis of the cylinder and caused to tumble back, means for circulating a washing fluid under pressure through said pipe, the pipe being formed with perforations through which the fluid is directed upwardly against the articles as they are tumbled by the baffles, the said cylinder comprising a washing compartment through which said fluid is circulated, a rinsing compartment and a drying compartment, a partition in said pipe between the washing and rinsing compartments, means for circulating a rinsing fluid in the rinsing compartment, a cylindrical drum of smaller diameter than the cylinder mounted within and extending lengthwise of said drying compartment concentric with said pipe, said drum having a single slot extending lengthwise thereof, throughout the length of the drying compartment, and means for supplying heated air to the drum and forcing it through said slot and directing it against the articles in the drying compartment, said row of baffles extending throughout the length of all of said compartments.

3. Apparatus for washing, rinsing and drying molded plastic articles or other articles, said apparatus comprising a tubular cylinder mounted with its axis extending horizontally, means for continuously rotating the cylinder about its axis, a spiral web within the cylinder and extending substantially the full length thereof, said web being secured to the cylinder for rotation therewith and in contact with the inner wall surface of the cylinder throughout its length, means for feeding the articles to the cylinder at one end thereof and discharging them at the opposite end of the cylinder, said articles being caused to advance lengthwise of the cylinder by the spiral web, a row of baffles attached to the inner wall surface of the cylinder and extending substantially the full length of the cylinder for lifting and tumbling the articles during their travel through the cylinder, the cylinder including a washing compartment, a rinsing compartment and a drying compartment, a stationary pipe co-axial with and extending through the cylinder, means for dividing said pipe into separate sections including a washing section in the washing compartment, a rinsing section in the rinsing compartment, means for circulating a washing fluid through the said washing section and washing compartment, separate means for circulating a rinsing fluid through the said rinsing section and rinsing compartment, said pipe sections having upwardly directed outlet openings through which the washing and rinsing fluids are discharged in an upward direction against the said articles, a tubular drum mounted within the drying compartment and surrounding and concentric with said pipe, said drum being of substantially smaller diameter than the cylinder, said drum being formed with a slot extending lengthwise thereof substantially the full length of the drying compartment, and means for supplying heated air to the drum and forcibly discharging it through the elongated slot against the articles within the drying compartment.

4. The apparatus defined in claim 3, the walls of the cylinder consisting of open work material allowing the free passage of the fluids and the drying air, said apparatus including a drain tank, directly beneath the washing and rinsing compartments of the cylinder and extending lengthwise of the cylinder, a transverse wall separating the tank into tank compartments located respectively beneath the washing and rinsing cylinder compartments and substantially co-extensive with said cylinder compartments in the direction of their length, the apparatus including separate and independent circulating systems by which the washing and rinsing fluids are circulated and directed through the washing and rinsing compartments respectively.

5. The apparatus defined in claim 4, the cylinder including a drain section interposed between the rinsing and drying compartments.

References Cited in the file of this patent

UNITED STATES PATENTS

| Number | Name | Date |
|---|---|---|
| 723,180 | Porter | Mar. 17, 1903 |
| 889,560 | Thull | June 2, 1908 |
| 1,422,309 | Schweinsberg et al. | July 11, 1922 |
| 1,445,276 | Hansen | Feb. 13, 1923 |
| 1,647,763 | Aldeen | Nov. 1, 1927 |
| 2,163,977 | Ferry | June 27, 1939 |
| 2,321,016 | De Back | June 8, 1943 |
| 2,427,388 | Curran | Sept. 16, 1947 |
| 2,503,556 | McCargar | Apr. 11, 1950 |

FOREIGN PATENTS

| Number | Country | Date |
|---|---|---|
| 67,439 | Germany | Mar. 17, 1893 |